United States Patent [19]

Simpson

[11] Patent Number: 4,718,446
[45] Date of Patent: Jan. 12, 1988

[54] TIME AND MOISTURE-RESPONSIVE SPRINKLER CONTROL SYSTEM

[76] Inventor: Bobby R. Simpson, 1072 Trask, Garden Grove, Calif. 92643

[21] Appl. No.: 852,323

[22] Filed: Apr. 15, 1986

[51] Int. Cl.⁴ .............................................. A01G 25/16
[52] U.S. Cl. .............................. 137/78.3; 137/624.11; 239/64; 239/70
[58] Field of Search ......................... 137/624.11, 78.3; 239/63, 70, 64; 361/178

[56] References Cited

U.S. PATENT DOCUMENTS

| | | | |
|---|---|---|---|
| 3,991,939 | 11/1976 | Maclay | 137/624.11 |
| 4,246,574 | 1/1981 | Sanner | 137/78.3 |
| 4,256,133 | 3/1981 | Coward et al. | 137/78.3 |
| 4,333,490 | 6/1982 | Enter, Sr. | 137/78.3 |

Primary Examiner—A. Michael Chambers
Attorney, Agent, or Firm—Allen A. Dicke, Jr.

[57] ABSTRACT

An electrically operated valve controls the flow of irrigation water. A clock controls the time of day and maximum irrigation time. The clock signal is serially connected through a control circuit which senses subterranean moisture and prevents solenoid actuation when moisture is adequate.

13 Claims, 2 Drawing Figures

TIME AND MOISTURE-RESPONSIVE SPRINKLER CONTROL SYSTEM

BACKGROUND OF THE INVENTION

This invention is directed to an irrigation sprinkler control system wherein a clock controls the day and time of day for sprinkling. A circuit responsive to soil moisture is connected serially between the clock and the solenoid operated valve to prevent irrigation when moisture is adequate.

Irrigation is needed in many arid areas for supplying water to architectural vegetation. Greenery is often planted around homes, commercial buildings and apartment developments to provide an attractive outdoor appearance for them. In order to minimize the manual labor of such irrigation and to avoid loss of plants when irrigation is forgotten, clocks are often used to control electrically actuated valves which supply water to the irrigation system. Such clocks have been developed to a point where one or more days of the week can be selected for sprinkling. Furthermore, the time of day and duration of sprinkling can also be selected. Such clocks sometimes have a plurality of terminals which can be connected to different water control valves for the control thereof. Such terminals are often referred to as stations. The clock usually sequentially energizes the stations, and the clock can be adjusted so that each station has its own individual adjustment of on time. In this way, irrigation of a number of different areas, each served by a station and a sprinkler valve, can be employed to deliver water to these areas in accordance with the program determined by the clock and independent of ground moisture. It would be desirable to conserve water by limiting the delivery of irrigation water when the ground moisture is adequate.

SUMMARY OF THE INVENTION

In order to aid in the understanding of this invention, it can be stated in essentially summary form that it is directed to a time and moisture responsive sprinkler control system wherein a ground moisture sensor is connected to a control circuit which permits current to flow to a water valve solenoid when the ground moisture is low and prevents current flow to the irrigation valve actuating solenoid when ground moisture is adequate.

It is thus an object and advantage of this invention to provide a sprinkler control system which is moisture responsive to prevent actuation of the sprinkler system when ground moisture is adequate.

It is a further object and advantage of this invention to provide a moisture responsive sprinkler control system which can be connected to a sprinkler control clock so that the clock provides time control of sprinkler actuation and a moisture responsive circuit prevents turning on of the sprinkler when ground moisture is adequate.

Other purposes and advantages of this invention will become apparent from a study of the following portion of the specification, the claims and the attached drawings.

DESCRIPTION OF THE PREFERRED EMBODIMENT

Figure 1:
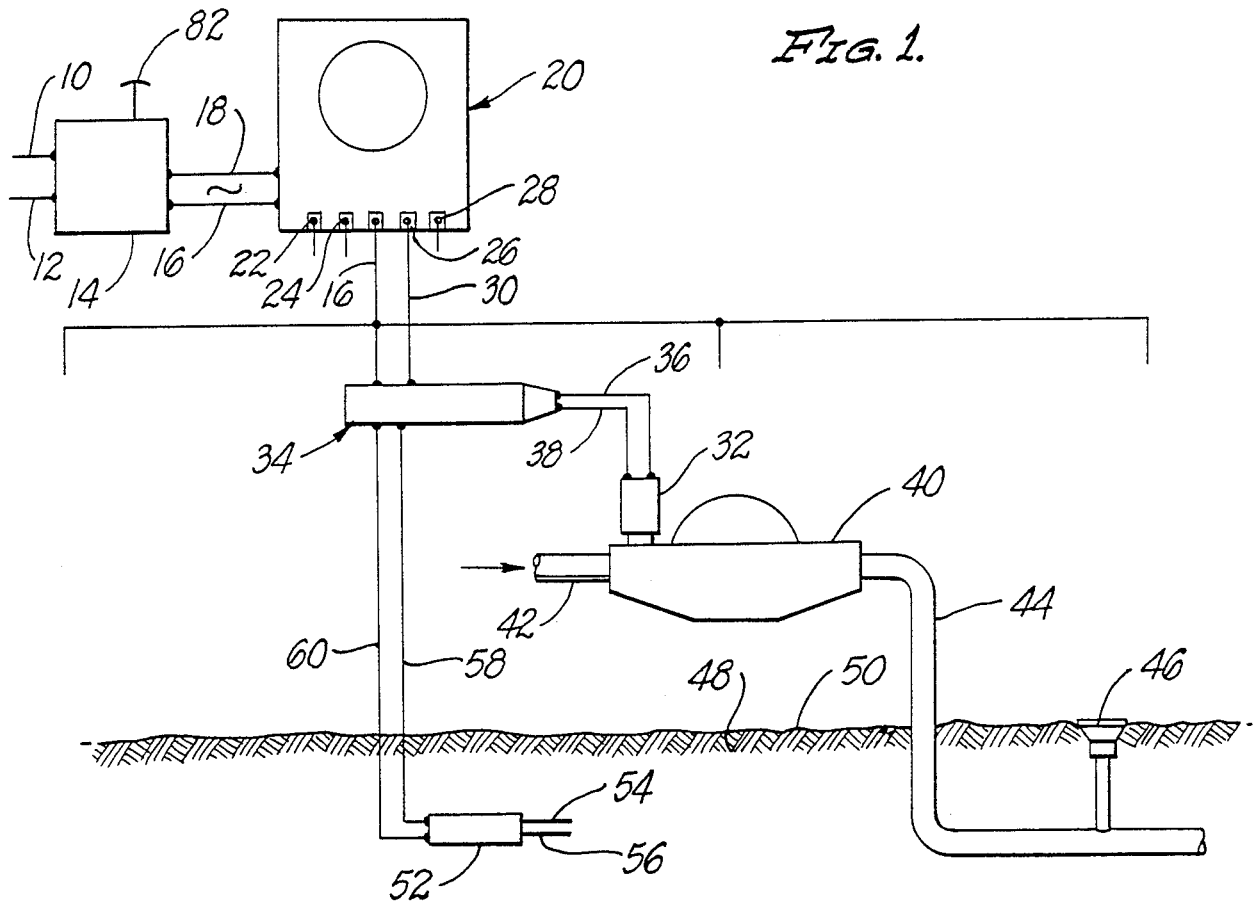
FIG. 1 is a schematic view of a sprinkler system which has both time and moisture responsive elements therein to control the sprinkler valve.

Conventional alternating current electric power is supplied in lines 10 and 12 to transformer 14. In view of the fact that much of the sprinkler wiring is outdoor, voltage below 24 volts is desirable. The transformer output is in ground line 16 and power line 18. The ground line 16 passes right through clock timer 20 so that it can supply a plurality of loads. Power line 18 supplies power to operate the clock mechanism in the clock timer structure. The clock carries switches by means of which, on particular selected days and particular selected hours, the output stations are sequentially energized for predetermined lengths of time. Output stations 22, 24, 26 and 28 are shown. Other clock timer structures may have more or fewer such stations. Output line 30 is connected to station 26. In the conventional sprinkler control circuit, the lines 16 and 30 would be directly connected to solenoid 32. In this case, those lines are connected through control circuit 34 to become lines 36 and 38.

Sprinkler valve 40 receives water from water pipe 42 which contains water under pressure. Sprinkler pipe 44 is connected to the output of sprinkler valve 40. Sprinkler pipe 44 is a distribution pipe which distributes water to a plurality of irrigation outflow water points such as sprinkler head 46. Sprinkler head 46 is mostly buried in the soil 48 with the top of its head substantially flush with the soil surface 50. Such sprinkler heads are suitable for lawn and serve merely as an illustration of one manner in which irrigation water may be delivered. The sprinkler head may be of other characteristics to deliver water as a spray, as a surface flooding delivery, or as a drip delivery, and the like. When solenoid 32 is energized, the valve is open and irrigation water is delivered.

Moisture sensor 52 has first and second plates 54 and 56 which are spaced from each other and are electrically isolated from each other as far as their mounting is concerned. Moisture sensor leads 58 and 60 are respectively connected to the plates. The plates are exposed in the soil and, when there is moisture in the soil, the moisture is ionized because of its impurity. Thus, with a higher moisture content in the soil, the resistance between plates 54 and 56 decreases.

Figure 2:
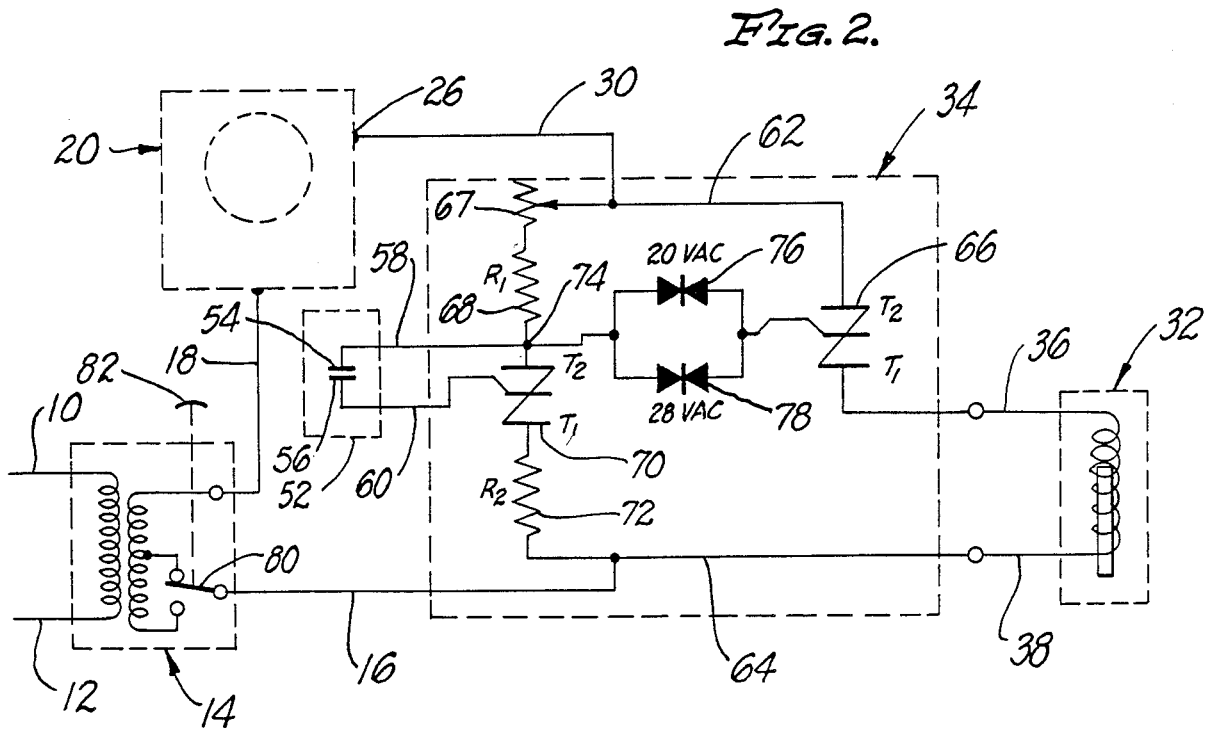
FIG. 2 is an electrical schematic of the control system.

FIG. 2 shows the control circuit 34 in more detail. The output line 30 from the clock timer is connected to bus 62, and the ground line 16 is connected to bus 64. Bus 64 is connected to line 38 of solenoid 32. Triac 66 has its terminal T2 connected to line 62 and its terminal T1 connected to line 36. Thus, triac 66 and solenoid 32 are serially connected between buses 62 and 64. Similarly, variable resistor 67, resistor 68, triac 70 and resistor 72 are serially connected between buses 62 and 64. The T2 terminal of triac 70 is connected to connection point 74 which is at the bottom of resistor 68. Connection point 74 is connected through diac 76 to the gate of triac 66. Diac 78 is connected in parallel to diac 76. In the preferred example, 24 volts AC RMS is normally supplied between buses 62 and 64. Variable resistor 67 preferably has a maximum value of about 500 ohms and is initially set at about 120 ohms. Resistor 68 is preferably about 100 ohms and resistor 70 is preferably about 220 ohms. In this example, diac 76 breaks down at about 20 volts AC peak-to-peak while diac 78 breaks down at about 28 volts AC peak-to-peak. Motorola symbology is used for the triacs and diacs.

When the switch 80 in transformer 14 is in the upper position, 24 volts RMS is supplied between buses 16 and 18. When clock 20 completes the circuit, the 24 volts is applied between buses 62 and 64. When moisture sensor 52 senses no moisture, there is essentially an open circuit between plates 54 and 56. In this condition, the gate of triac 70 is not biased and, thus, the triac 70 is nonconductive. In the absence of any significant current flow through resistors 67 and 68, the voltage at point 74 becomes the voltage of line 62, which is 24 volts with respect to bus 64. With this voltage applied, diac 76 breaks down causing current flow. Since diac 76 is connected to the gate of triac 66, the gate is biased to essentially the same potential as terminal T2 of triac 66 so that triac 66 becomes conductive. When it conducts, solenoid 32 is actuated.

The other case is when there is adequate moisture in the soil in the region of sensor 52. In that case, there is current between the plates 54 and 56 so that the gate of triac 70 is biased substantially to the potential of terminal T2 so that triac 70 becomes conductive. When it is conductive, the resistors 67, 68 and 72 divide the potential at connection point 74. Under these conditions the voltage is inadequate to cause diac 76 to conduct so that the gate of triac 66 is unbiased. Therefore, triac 66 does not conduct and the solenoid 32 is not actuated. Adjustment of resistor 67 changes the relationship between level of soil moisture versus turn-on of triac 70 so that the sensitivity of turn-on to soil moisture can be adjusted. Thus, the solenoid actuation is in response to soil moisture.

Manually actuatable switch handle 82 is connected to actuate switch 80, see FIG. 2. When the switch is actuated to the lowered position, the potential applied between lines 16 and 18 is about 30 volts AC RMS. The purpose of the manual switch actuator 82 is to permit the operator to eliminate the control of the moisture sensor. With the switch 80 in the lower position, solenoid 32 is actuated whenever such is indicated by clock 20, independent of ground moisture condition. Under these conditions, with the switch 80 in the lower position and the clock 20 closing the sprinkler circuit, there is about 30 volts RMS supplied between buses 62 and 64. When the moisture sensor 52 senses adequate moisture, triac 70 is turned on to divide this potential at connection point 74, but the peak-to-peak voltage applied to diac 76 is sufficiently high to cause it to conduct. This conduction causes conduction of triac 66 to actuate solenoid 32.

The control circuit 34 thus contains an inverting logic circuit which normally causes the triac 66 to be nonconductive when the sensor 52 is conductive, but the circuit logic can be controlled so that the triac 66 can become conductive even when sensor 52 is conductive. The normal logic circuit inversion is accomplished by triac 70 and its resistor bridge and the diac 76 which prevents gate signal on triac 66 until the diac voltage is exceeded either in normal operation or in override operation.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A time and moisture responsive sprinkler control system comprising:
    a source of alternating current electric power, said source having selector means for selecting between higher voltage and lower voltage;
    a control circuit for connection to said source of alternating current electric power and serially connecting a clock for controlling sprinkler on time and an electric motor for controlling a sprinkler valve, said control circuit also including a moisture sensor for sensing subterranean moisture;
    said control circuit including a switch serially connected between said power source, said clock and said electric motor for controlling flow of electric power from said power source to said electric motor, and connection means for connecting the moisture sensor to said switch to control said switch when said selector means selects lower voltage and eliminates control by said moisture sensor when said selector means selects higher voltage.

2. A time and moisture responsive sprinkler control system comprising:
    a switchable electric power source switchable from a lower to a higher AC voltage;
    a clock serially connected to said AC electric power source to selectively pass AC power to an AC clock output line in accordance with clock settings;
    an AC control circuit connected to said AC clock output line;
    a subsoil moisture sensor connected to said AC control circuit to provide a subsoil moisture signal to said control circuit;
    an electrically operated sprinkler valve connected to said AC control circuit so that said power source, said clock, said AC control circuit and said sprinkler control valve are serially connected, said AC control circuit including means responsive to the lower voltage for controlling said sprinkler valve as a function of said clock and said subsoil moisture sensor so that when both said clock and said subsoil moisture sensor require water said sprinkler valve is turned on and means responsive to the higher voltage and connected to said clock and said sprinkler valve so that when said electric power source is at its higher voltage, said sprinkler valve is turned on when said clock requires water.

3. A time and moisture-responsive sprinkler control system comprising:
    a moisture sensor for insertion into the earth for indicating moisture level in the earth;
    a time clock for indicating time of day for when sprinkling is desired;
    an alternating current power source, means associated with said power source for selectively producing a first voltage and a second voltage, with one of said voltages being higher than the other of said voltages;
    an electric motor for connection for controlling the flow of water to a sprinkler;
    a switch connected between said power source and said motor for controlling the flow of power from said power source to said motor; and
    a control circuit connected to said power source, said moisture sensor and said switch for energizing said motor with the application of the first AC voltage to said moisture sensor when said moisture sensor and said clock call for sprinkling and for energizing said motor when the second AC voltage is applied and said clock calls for sprinkling, independently of said moisture sensor calling for sprinkling.

4. The control system of claim 3 wherein said switch is an electronic switch and said current includes logic for controlling said electronic switch from said moisture sensor.

5. The control system of claim 3 wherein said electronic switch for connection in series between said power supply and said motor is a first electronic switch and said logic circuit of said control system includes a second electronic switch for connection to be actuated by said moisture sensor.

6. The control system of claim 5 wherein said control system includes a bridge, said bridge comprising first and second resistors and said second electronic switch, said second resistor being connected to a first terminal on said second electronic switch, the second terminal on said second electronic switch being connected to a connection point and to said first resistor so that the voltage at said connection point is divided between said first and second resistors when said second electronic switch is on.

7. The control system of claim 6 wherein the gate of said second electronic switch and said connection point are for connection to the moisture sensor so that the on condition of said second electronic switch is controlled by the moisture sensor.

8. The control system of claim 7 wherein said connection point is connected through an electronic voltage breakdown device to the gate of said first electronic switch so that when the voltage at said connection point exceeds the breakdown voltage of said electronic breakdown voltage device, the signal at said connection point is applied to the gate of said first electronic switch to cause conduction thereof.

9. The control system of claim 8 wherein said first electronic switch is a triac.

10. The control system of claim 9 wherein said electronic voltage breakdown device is a diac.

11. The control system of claim 10 wherein said second electronic switch is a triac.

12. The control system of claim 8 wherein there is means for applying at said connection point a voltage which exceeds the breakdown voltage of said electronic breakdon voltage device for turning on said first electronic switch independent of the sensed moisture.

13. The control system of claim 12 wherein said means is a selective power supply which can selectively supply voltage sufficiently high so that the voltage at said connection point is sufficiently high to cause conduction of said said electronic breakdown voltage device.

* * * * *